Figure 1A:
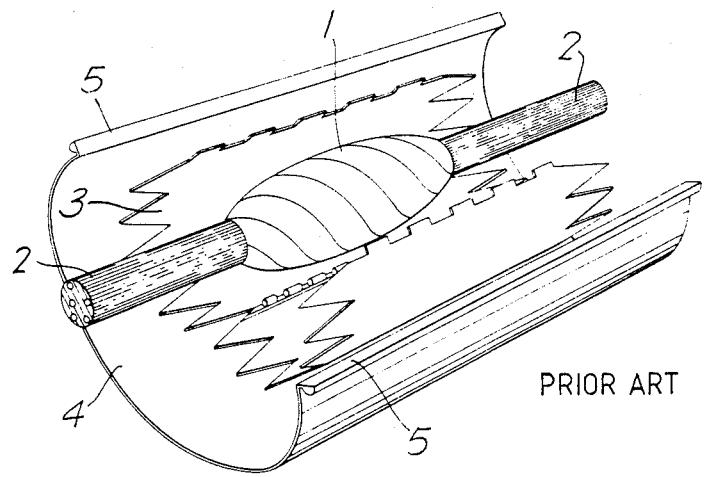

United States Patent [19]
Nolf et al.

[11] Patent Number: 4,880,962
[45] Date of Patent: Nov. 14, 1989

[54] ELECTRICAL DEVICE

[75] Inventors: Jean-Marie E. Nolf; Jan L. M. F. G. Vansant, both of Korbeek-Lo, Belgium; Michael L. Jensen, Cary, N.C.

[73] Assignee: Raychem Corporation, Menlo Park, Calif.

[21] Appl. No.: 160,055

[22] Filed: Feb. 24, 1988

[30] Foreign Application Priority Data

Feb. 24, 1987 [GB] United Kingdom ................. 8704232

[51] Int. Cl.$^4$ .............................................. H05B 3/36
[52] U.S. Cl. .................................... 219/549; 219/505; 219/528; 174/DIG. 8
[58] Field of Search ............... 219/504, 505, 528, 535, 219/541, 544, 547, 548, 549, 553; 174/DIG. 8, 72 A, 72 C; 156/81, 49, 274.4, 274.8, 275.1, 275.3

[56] References Cited

U.S. PATENT DOCUMENTS

| | | | |
|---|---|---|---|
| 4,532,164 | 7/1985 | Claunch | 219/549 |
| 4,548,662 | 10/1985 | Chazan | 219/549 |
| 4,641,009 | 2/1987 | Vansant | 219/505 |
| 4,675,512 | 6/1987 | Doucet | 219/505 |
| 4,689,474 | 8/1987 | Overbergh | 219/528 |

Primary Examiner—A. D. Pellinen
Assistant Examiner—Leon K. Fuller
Attorney, Agent, or Firm—Timothy H. P. Richardson; Herbert G. Burkard

[57] ABSTRACT

An electrical heater suitable for heating a hot-melt adhesive to seal a cable splice case. The heater is in strip form and comprises a conductive polymer between two electrodes. The conductive polymer has a positive temperature coefficient of resistance and is thereby self-regulating. Current in-rush when the heater is cold is reduced by initially having only a portion of the heater connected to the power source.

7 Claims, 12 Drawing Sheets

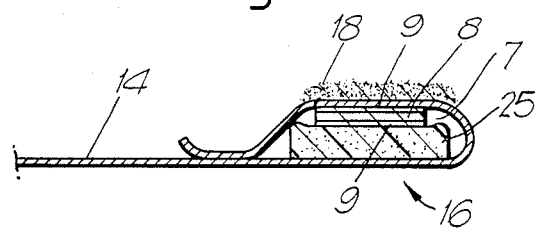
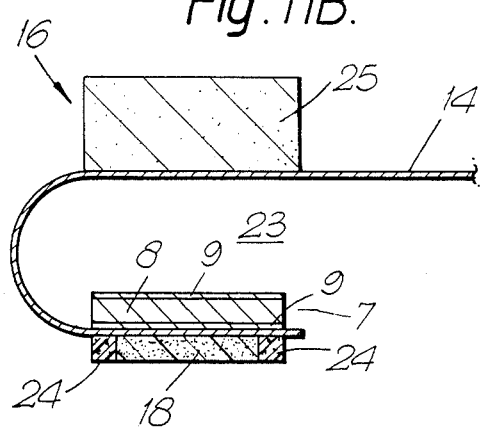
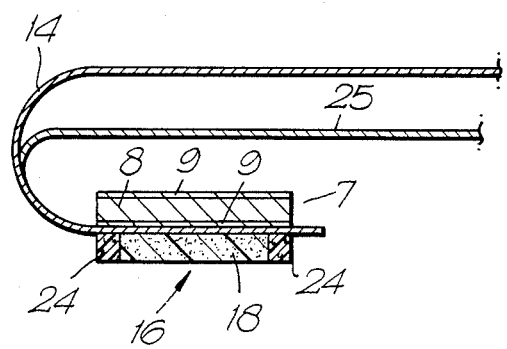

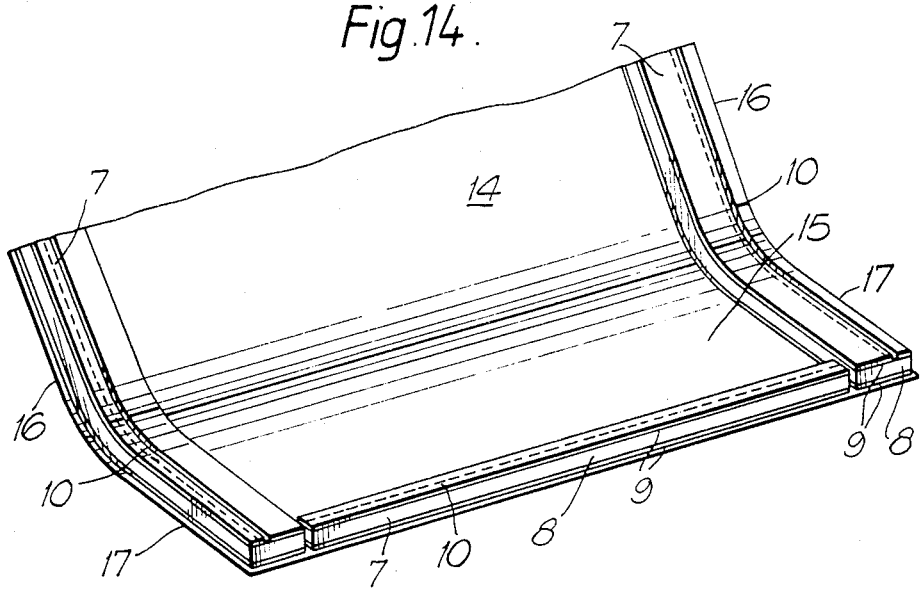
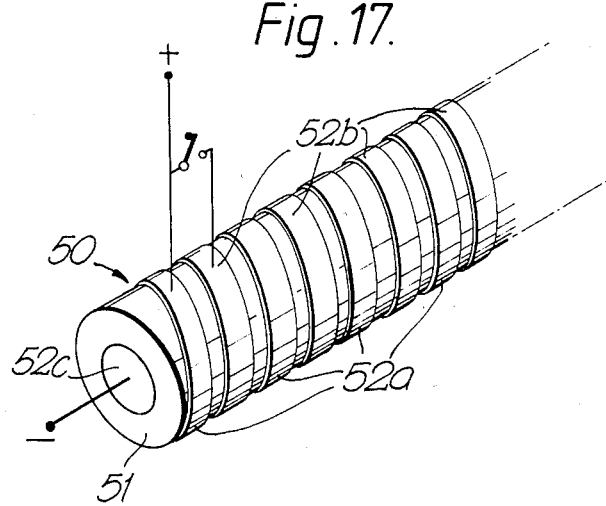

ELECTRICAL DEVICE

The present invention relates to an electrical device useful in the environmental protection of substrates such as cable splices, particularly telecommunications cable splices. Although the electrical device will have other uses, it will be described primarily in terms of a preferred use, namely as a heater for a cable splice case.

A cable splice is in general formed by removing insulation from the ends of the cables to be joined, splicing the conductors therein, and forming around the resulting splice bundle a covering, called a splice case, in order to protect the otherwise exposed spliced conductors.

One of the most successful and widely used designs of cable splice case is that marketed by Raychem under the trade marks XAGA and VASM. There, a heat-shrinkable polymeric sleeve is installed around the splice to be protected, and heat is applied to cause it to shrink down into engagement with the cables either side of the sleeve. A propane torch is usually used to apply the heat. In order to provide further mechanical strength and, where desired, to provide further resistance to water vapour penetration, an internal liner may be provided around the splice bundle, and the sleeve installed around the liner.

The sleeve may be internally coated with a hot-melt adhesive to provide a bond between the sleeve and the cables and, where present, the liner. The step of heating not only causes heat-shrinkage of the sleeve, but also activation of the hot-melt adhesive.

Whilst this type of splice case is simple to install and has excellent performance, it has the disadvantage in requiring the use of a torch for installation. Where a cable to be spliced runs in, for example, a duct or manhole shared with gas pipes or where the object to be environmentally protected is itself a gas pipe the use of a torch is undesirable and may be forbidden.

We have now designed a simple electrical heater that is particularly useful for installing a splice case that is applicable to a wide range of cable sizes and branch-off configurations.

Thus, the present invention provides an electrical heater in strip form, which comprises:

(a) a conductive strip heating element comprising a conductive polymer composition;

(b) a first electrode in strip form lying on a first surface of said strip and running along said strip;

(c) a second electrode in strip form lying on said first surface of said strip and running along said strip, said second electrode being spaced apart from said first electrode;

(d) a third electrode lying on a second surface of said strip opposite said first surface and running along said strip;

(e) means by which the first and second electrodes can be connected together;

(f) means by which the first and/or second electrodes can be connected to a first polarity of a source of electrical power; and (g) means by which said third electrode can be connected to a second polarity of said source of electrical power;

the electrical widths of the first electrode being from 30–50% of the electrical width of the third electrode.

By electrical width we mean that width of an electrode (which may be 100% of its total width) that is available for passage of current between the third electrode and the first and/or second electrode through the conductive polymer. The electrodes may be wider (parts being insulated from the composition) in order for them to act as buses etc.

The invention also provides an electrical heater in strip form, which comprises (a) a conductive strip heating element comprising a conductive polymer composition;

(b) a first electrode in strip form lying on a first surface of said strip and running along said strip;

(c) a second electrode in strip form lying on said first surface of said strip and running along said strip, said second electrode being spaced apart from said first electrode;

(d) a third electrode lying on a second surface of said strip opposite said first surface and running along said strip, said third electrode being substantially coextensive with both of said first and second electrodes and space therebetween;

(e) means by which the first and second electrodes can be connected together;

(f) means by which said first and/or second electrode may be connected to a first polarity of a source of electrical power; and (g) means by which said third electrode can be connected to a second polarity of said source of electrical power.

The invention also provides an electrical heater which comprises (a) a first part comprising
 (i) a first electrode
 (ii) a second electrode
 (iii) a heating element comprising a first conductive polymer composition exhibiting PTC behaviour, and being electrically connected to the first and second electrodes such that when a source of electrical power is connected to the first and second electrodes current $I_1$ flows through the composition causing it to become hotter and its resistivity thus to increase, the maximum current flowing $I_{1MAX}$ being less than 75 amps;

(b) a second part, in thermal contact with the first part and comprising:
 (i) a third electrode
 (ii) a fourth electrode
 (iii) a heating element comprising a second conductive polymer composition exhibiting PTC behaviour and being electrically connected to the third and fourth electrodes such that when a source of electrical power is connected to the third and fourth electrodes current flows through the composition causing it to become hotter and its resistivity thus to increase; and (c) means whereby said first and second parts can be connected in parallel;
the first and second heating elements being such that if the first and second parts are connected in parallel after t seconds a current $I_2$ flows through the combined first and second parts the maximum of which $I_{2MAX}$ is less than 75 amps, there being a value of t at which the ratio between $I_{1MAX}$ and $I_{2MAX}$ is from 1.5:1 to 1:0.67.

The invention further provides an electrical heater in sheet form, which comprises:

(a) a conductive sheet heating element comprising a conductive polymer composition;

(b) a first electrode in strip form lying on a first surface of said sheet;

(c) a second electrode in strip form lying on said first surface of said sheet and being spaced apart from and substantially parallel to said first electrode;

(d) a third electrode in strip form lying on said first surface of said sheet and being spaced apart from and substantially parallel to said second electrode;

(e) a fourth electrode lying on a second surface of said sheet, opposite said first surface, said fourth electrode being substantially coextensive with said first, second and third electrodes and spaces therebetween;

said first, second and third electrode being alterable between the following states (i) in which each of said first, second and third electrodes is substantially electrically insulated from another, other than through the sheet (ii) in which two of the said first, second and third electrodes are connected together and those two are substantially electrically insulated from the third other than through the sheet; and (iii) in which said first, second and third electrodes are connected together.

The invention still further provides an electrical heater which comprises a laminate of the following layers in the following order (a) first and second substantially coplanar electrodes in strip form;

(b) a conductive polymer composition exhibiting PTC behaviour;

(c) a ZTC composition comprising a conductive polymer and a thermally conductive filler therein; and (d) a third electrode.

The invention also provides an electrical heater which comprises a laminate of the following layers, in the following order (a) a first electrode;

(b) a ZTC composition having a thickness of from 10–500 microns and a resistivity at 20° C. of from 1–100 ohm cm;

(c) a PTC composition having a thickness of from 50–500 microns and a resistivity below its switching temperature of from 1–100 ohm cm;

(d) a ZTC composition having a thickness of from 100–500 microns and a resistivity at 20° C. of from 75–10,000 ohm cm;

(e) a ZTC composition having a thickness of from 10–500 microns and a resistivity at 20° C. of from 1–100 ohm cm; and (f) a second electrode.

The invention also provides an electrical heating apparatus which comprises:

(a) an electrical heater comprising (i) a first part comprising a first and a second electrode and a first conductive polymer composition exhibiting PTC behaviour, the composition being electrically connected to the first and second electrodes such that when a source of electrical power is connected to the first and second electrodes current flows through the composition causing it to become hotter and its resistivity thus to increase, and (ii) a second part comprising a third and a fourth electrode and a second conductive polymer composition exhibiting PTC behaviour, the composition being electrically connected to the third and fourth electrodes such that when a source of electrical power is connected to the third and fourth electrodes current flows through the composition causing it to become hotter, and its resistivity thus to increase;

(b) means for providing a thermal connection between said first and second parts such that current flow through the first composition causes an increase in resistivity of the second composition;

(c) means for connecting the first part and the second part together in parallel with respect to a common source of electrical power.

The electrical heater preferably forms part of an article, particularly a cable splice case, (which may be supplied in kit form, but is preferably in one piece) for environmentally protecting an elongate substrate particularly a cable splice, which comprises:

a first sheet having a first edge portion said first sheet optionally being dimensionally-recoverable;

a second flexible and substantially planar sheet having a second edge portion said second sheet optionally being dimensionally-recoverable;

a heat-activatable sealing material that can be positioned between the first and second edge portions;

means for holding the first and second edge portions together and around the substrate;

means for displacing the sealing material to form a seal between the first and second edge portions and the substrate; and said electrical heater positioned so as to be able to activate the sealing material and/or to cause dimensional recovery of the first and/or second sheet.

By flexible we mean that the sheet can be deformed by wrapping folding or bending by hand, and by highly flexible that it can be deformed easily by hand. By substantially planar we mean that the sheet is not preformed such that it has a central body region and fixed shaped outlets that can accomodate only a single size and configuration of cables. The skilled man would in practice be able to make this distinction easily.

We prefer that the electrical heater be provided for activating, preferably softening the sealing material. It is particularly preferred that the heater be flexible, more preferred that it be highly flexible, in order that it can conform to a surface of the substrate. Operation of the heater may be controlled by the power supply or by the operator, for example by some switching operation that occurs after a certain period of time or after some change in the heater. The power supply may be capable of being set according to the size of splice case the heater is to heat, or according to something else such as ambient temperature. Thus, the total heating time may be set by the operator, and the power supply may automatically carry our such switching at a time which is a fixed function (such as a fixed fraction) of that total time. In any case, we prefer that regulation occurs at a temperature between 100 and 140° C., preferably about 125° C. We also prefer that the heater is in the form of a tape that runs at least between the first and second edge portions. The tape may be provided as part of the sheets along both said edge portions or along one only, or a single length of heater tape may be positioned between the edge portions during installation of the sheet. The tape or other heating means is preferably highly flexible, and therefore preferably thin, in order that the sheets be able to conform to the substrate they are environmentally to protect.

The first and second sheets may be joined together before use or may be integral parts of a larger sheet or may be separate before installation. We prefer they are integral parts of a larger sheet, which larger sheet may be wrapped around the substrate, for example by generally folding it in half, in the fashion of closing a newspaper, around the substrate. The part of the larger sheet on one side of the substrate may be regarded as said first sheet, and the part on the opposite side as said second sheet. The advantage of the first and second sheets being integral is that the edge which is formed by the fold line does not need to be sealed. We prefer that the first sheet, as well as the second sheet, is flexible and substantially planar.

A clamp or other closure means may be applied, optionally as part of said means for displacing, for holding corresponding edge portions of the first and second sheets together. In general, the first and second sheets will be substantially rectangular and the substrate will protrude out from opposite edges, preferably the short edges. One of the long edges will be formed by the fold line, and the other long edge will require sealing. The means for holding and the means for displacing referred to above act on the edges (or edge) from which the substrate protrudes, in this case the short edges. The long edges, if they require sealing, may be sealed in the same or in a different manner.

The splice case may additionally comprise a casing which may surround the splice and first and second sheets. Such casing may offer further mechanical protection, for example against impact and vibration damage and/or it may provide at least part of a means for holding and/or a means for displacing in respect of any edge portion of the sheets to be sealed. Preferably, such a casing provides protection against impact damage and holds together edge portions of the first and second sheet from which the substrate does not protrude (generally edge portions opposite a fold line and perpendicular to the edge portions from which the substrate does protrude). Alternatively, or in addition, some mechanical reinforcement may be provided around the splice between the sheets. Furthermore, engagement between the sheets and the casing may allow axial stress on the substrates to be transferred via the sheets (to which they are sealed) to the casing, thus in the case of a cable splice providing strain relief across the splice.

The sheets preferably comprise a polymeric material optionally together with a metal layer such as aluminium foil to reduce transmission of water vapour. Recovery may be provided in the direction that will be transverse to the elongate substrates, since shrinkage in that direction may help to reduce any voids adjacent the substrate. Recovery, however, will not generally be required in order to form a seal. This is of considerable benefit since the amount of energy required for installation is thereby reduced. Also, dimensional stability may simplify the design of the product, particularly where an electrical heater is provided as part of the product since dimensional change of the heater does not have to be provided for.

Sealing occurs by means of the sealing material, such as an adhesive, a gel or a sealant (such as a mastic), and especially a hot-melt adhesive. The sealing material is preferably provided only around edge portions of the sheet where a seal between edge portions and/or a seal between an edge portion and the protruding substrate is required for an environmental seal, i.e. to isolate the volume within the double layer of sheets from the outside. Thus, where the two sheets are integral, being part of a larger rectangular sheet that is folded substantially in half around the splice, the three edge portions to be sealed (the forth is a fold) are provided with the sealing material. The sealing material may be provided on the three edge portions of each sheet, on the three edge portions of one sheet only, partly on one sheet and partly on the other, or supplied as a separate component (for example as a strip of adhesive) that is inserted between the sheets at some stage during the installation procedure. The heater may comprise one or more parts so configured as only to be adjacent the sealing material at the portions referred to. The sealing material is preferably a different material from that of the sheets, but it may at least in part be integral with the sheets in which case a weld may be formed.

An advantage of localizing the sealing material at the edge portions or other areas where a seal is required, is that the energy required to soften, for example melt, the material is reduced due to a smaller amount of it being used. The temperature required to melt preferred adhesives, such as polyamide based adhesives, is generally lower than that to cause heat-shrinkage of the material usually used in this field, say 70°–120° C. instead of 130°–150° C. Thus, an article of the present invention can provide an excellent environmental seal using a much smaller amount of power for example from 20–150 watt hours over the size ranges generally encountered in the telecommunications cable field, compared with 30–300 watt hours for a fully heat-shrinkable and adhesive coated sleeve of the prior art design. Power consumption is preferably 1000–2000 watts, more preferably 1000 to 1700 watts, and maximum current inrush to the heater is preferably kept below 75 amps, preferably below 50 amps.

Where the splice case is to seal a branched splice (for example a splice where one cable is joined to two branching cables, which two cables leave the splice bundle substantially side-by-side) means may be provided to bring together between the branching cables edge portions of the first and second sheets. In this way voids between the branching cables and the first and second sheets may be reduced. A branch-off clip as disclosed and claimed in GB No. 1604986 (N.V. Raychem S.A.) may be used for this purpose. A branch-off clip, again optionally as disclosed in GB No. 1604986, may also be used either side of the branching cables to hold together the first and second sheets. In order that the sheets conform to the cables, or otherwise as desired, a high level of flexibility of the edge portions is preferred and this may limit the amount of adhesive. One way in which flexibility may be retained with much adhesive is to provide the adhesive in corrugated or ridged form with the corrugations or ridges running perpendicular to the direction in which bending is required.

The means for displacing the sealing material is preferably resiliently biased or capable of being resiliently biased to a form from which it can relax, and in relaxing cause displacement of the sealing material. The sealing material will flow under the force of the means for displacing into any voids which would constitute a leak path into the splice case which is being constructed. We prefer that the means for displacing is rendered resiliently biased after the first and second sheets have been positioned either side of the substrate. Various clips or clamps or other means that may be used to secure the two sheets with respect to each other and/or with respect to the substrate may serve to render said means resiliently biased. Once the sheets have been properly secured, the splice case may be heated. Heat may cause the sealing material to soften, and flow by reason of the relaxation of the means for displacing.

In one embodiment, the means for displacing comprises a foam, preferably in strip form that runs along at least part of the first and/or second edge portion. At some stage, preferably during installation of the article of the invention, especially on insertion of clips and clamps that hold the first and second sheets relative to one another, the foam is compressed. On heating the edge portions, where the sealing material may be located, the foam can relax causing displacement of the softened sealing material. We prefer foam of a thickness of 0.5–5 cm, especially 1.0–3.0 cms, and polyurethane foam has been found to be suitable.

The article of the invention may be provided with means for aiding retention of pressure within it, and such means may be particularly useful where the article is to protect a joint between pressurized cables. The means may serve to reduce the extent to which a seal between the first and second sheets or between either sheet and the substrate is put, or to avoid such a seal being put, into peel by pressure within the resulting splice case. This may be done by providing one or both sheets with edge portions having a generally V-shaped (which includes U and other similarly shaped) transverse cross-section. The apex of the V faces away from the inside of the splice case and the two limbs of the V are able to open up in response to pressure within the splice case. One limb of the V may comprise the first or second sheet proper, and the other limb may be sealed to the substrate or to the second or first sheet respectively. Thus, the sheet is provided with what is known in other contexts as a V-seal. The electrical heater, particularly when in strip form, may be provided between the limbs of the V.

It is desirable that the heater be provided with some form of regulation, and self-regulation with respect to temperature is preferred. The heater may comprise a conductive polymer or other composition that has a positive temperature coefficient of resistance (PTC) such that when it reaches a certain temperature, or over a certain temperature range (the autotherm or switching temperature), its resistance increases significantly, thereby reducing its power output. We prefer that the heater is powered by a simple power supply, for example a battery of less than 50 volts, for example of 24 or 12 volts or through a simple AC power supply. A problem associated with some prior art PTC heaters is that their resistance on initial connection to a source of power is too low and hence a large in-rush current flows. This may damage the heater or the power supply. It is difficult to overcome this problem, particularly in the context of thin strip heaters as are preferred here, by chemical formulation of the PTC material of the heater. We have discovered that this problem can be overcome by the provision of at least two heater parts, preferably in thermal contact and more preferably integral, that may be electrically connectable together, preferably in parallel, after a first one of them has become hot and therefore after its resistivity has increased. On initial connection to a source of electrical power, the heater (i.e. active part thereof) is small and therefore an excessive current is not drawn. When that part has become hot and generally when it has reached its autotherm temperature, the second part is connected. That part too is small and the first part is no longer drawing a high current, so on making the second connection the current drawn is again not excessive. It is preferred that the current inrushes on initial and second connection are substantially equal, and for most applications the larger should be not more than 1.5 times the smaller.

The heater is preferably in strip form and preferably has a thickness less than 2.5 mm, more preferably less than 1.5 mm, especially less than 1 mm, to ensure flexibility. The device preferably has a heating capacity at steady state of 0.2 to 2.0, more preferably 0.5 to 1.4 watts per sq. cm, and less than 5.0, preferably less than 2.5 watts per sq. cm. at inrush. These devices preferably self-regulate at a temperature between 100 and 140° C., more preferably between 115° and 130° C., particularly about 125° C. The width of the heater will depend on the job it has to do, and for most cases we prefer a width of 1–15 cm, more preferably 2–12 cm. The heater can be of any length desired, although if it is very long it may be desirable to apply power to more than one pair of points along its length, to employ thick electrodes, or to employ some supplementary form of bussing. For a splice case typical lengths are from 20–400 cms, more typically from 50–300 cm.

We prefer that the splice case be such that the total energy required each day by the installer is less than 50%, especially less than 20%, preferably about 10% of a 70 amp hour car battery. An automobile charging system should be able to cope with this additional load. This preferably allows, say, up to 6 articles of the invention to be installed. Where the article of the invention is to seal a telecommunications cable splice, we prefer that about 4 of the widely used smaller (A) sizes be installable with this total amount of power, or 3 of the B sizes, 2 of the C sizes or one D or E size. The ambient temperature will have an effect, and the above figures preferably hold to about 20° C.

Some means, such as a diode, is preferably provided to prevent current flowing from the battery pack to the automobile at low automobile battery voltage, e.g. When starting.

In an alternative construction the heater is in the form of a coaxial laminate strip. Such a heater may for example comprise a central core conductor (the third electrode) surrounded by a jacket of conductive polymeric composition and finally surrounded by two further conductors (the first and second electrodes). Thus the first and second electrodes are on a first surface (the outer surface) of the conductive polymer strip and the third electrode lies on a second surface (the inner surface) of the conductive polymeric strip, opposite the first (outer) surface. The conductive polymeric jacket may comprise a PTC and/or ZTC layer. The first and second electrodes may take any suitable form in which they are separated from each other. For example the first and second electrodes may comprise two elongate strips helically, and alternatively, wrapped around the conductive polymeric layer so that there is a gap between each electrode. As another example the first and second electrodes may comprise a single strip wrapped around the conductive polymeric material so that there is a gap between longitudinally opposed edges thereof, the strip having longitudinal rout along the length of the strip to provide two separately powerable electrodes. Electrical powering of the first, second and third electrodes of this construction can be effected in the same manner as for the constructions described previously.

A coaxial strip type construction is typically desirable for heating applications such as pipe tracing. In such applications, unless special provisions are made high inrush currents may result, particularly where long lengths are used. The present invention is thus particularly applicable for such applications.

Figure 1B:
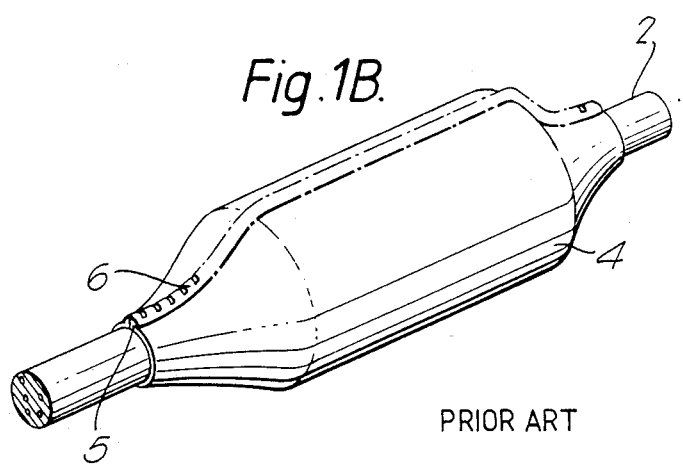
Figure 6:
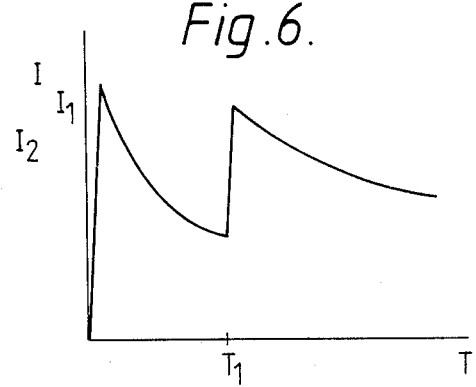
Figure 7:
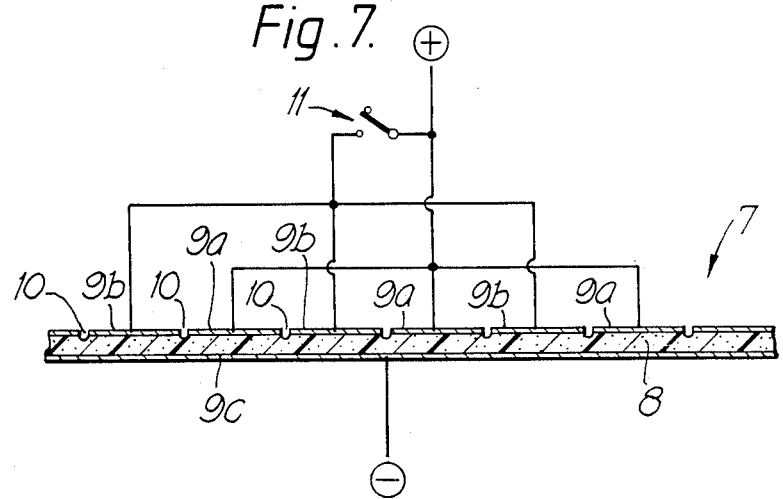
Figure 12A:
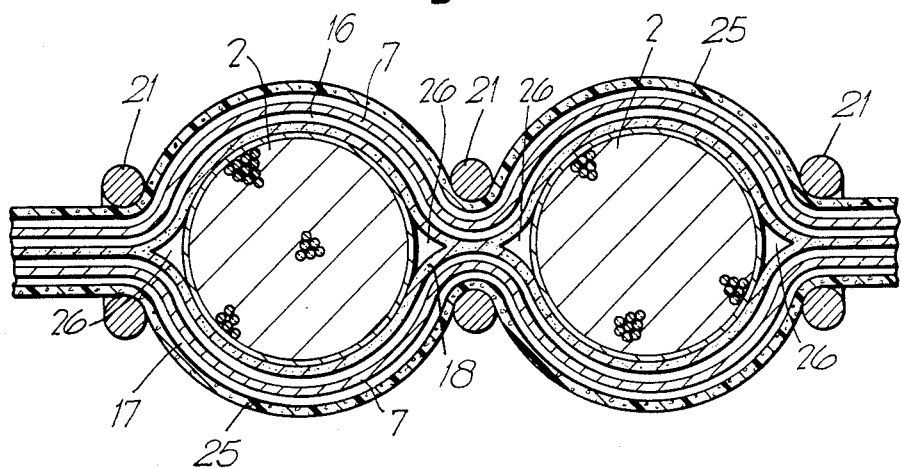
Figure 12B:
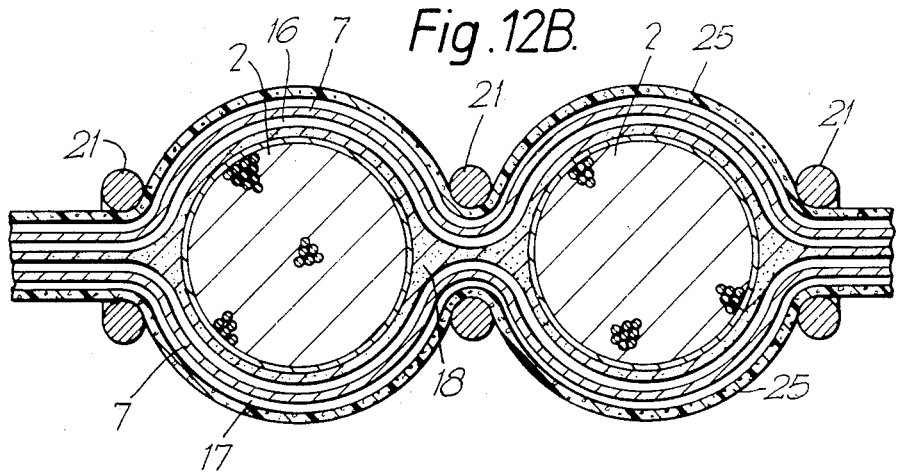
Figure 13:
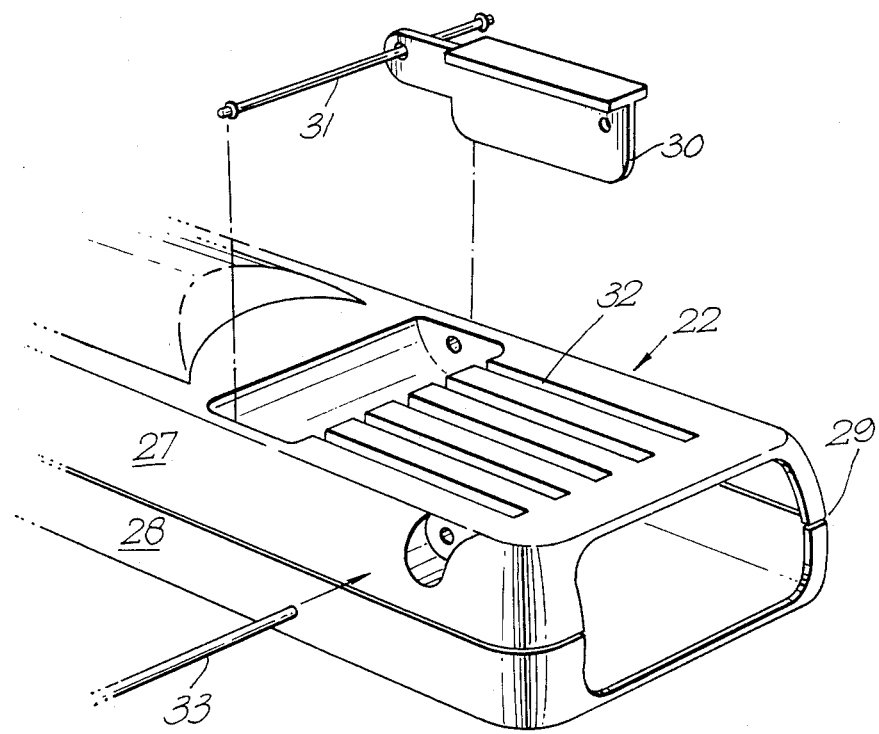
Figure 15A:
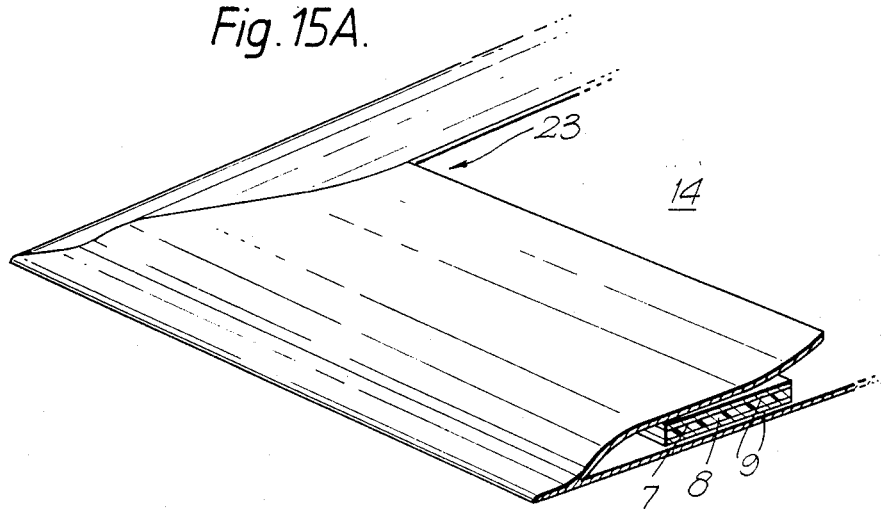
Figure 15B:
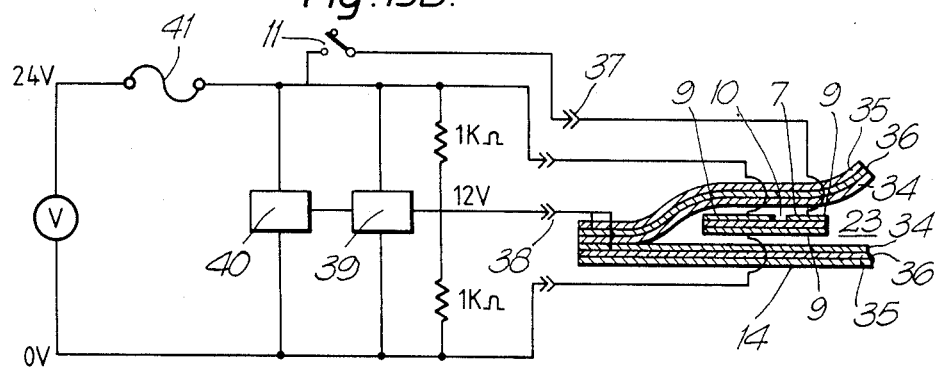
Figure 16:
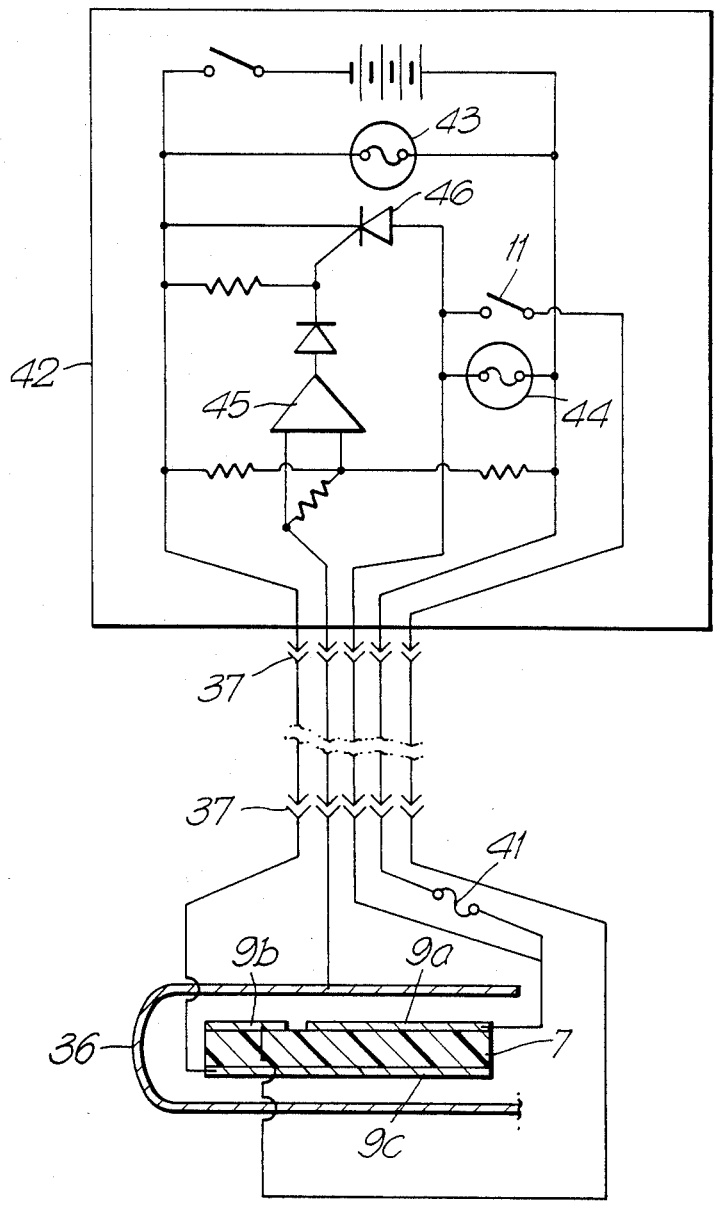

The invention is further illustrated with reference to the accompanying drawings, in which:

FIGS. 1A and 1B show a prior art cable splice case;
FIGS. 2-5 show electrical heaters of the invention;
FIG. 6 shows variation of current draws with time for a heater of the invention;
FIG. 7 shows a further design of heater;
FIGS. 8A-10B show a preferred design of splice case for use with the heater of the invention;
FIGS. 11A, 11B and 11C show positioning of a heater in an edge portion of a spice case;
FIGS. 12A and 12B show displacement of adhesive, heated by a heater;
FIG. 13 shows a casing being part of a splice case with which the heater may be used;
FIG. 14 shows an arrangement of three heater parts on a splice case;
FIGS. 15A, 15B and 16 show a safety means; and
FIG. 17 shows a further design of heater.

FIGS. 1a and 1b show one of the most widely used prior art telecommunication cable splice cases. It is marketed by Raychem under the trade marks XAGA and VASM. A cable splice 1, which may be quite bulky due to the presence of a large number of conductor connectors, joins two cables 2. A liner 3 is wrapped around the splice in order to provide mechanical protection and optionally a water-vapour barrier. The splice case is completed by a heat-shrinkable polymeric sleeve 4 that is wrapped around the liner and secured in its wrapped around configuration by bringing together rails 5. The sleeve is then shrunk and an internal adhesive coating melted by applying heat, generally using a propane torch, to seal the cables 2 and the liner 3.

The installed configuration is shown in FIG. 1b, which also shows a channel 6 that has been slid over the rails 5 to hold them together.

Figure 2:
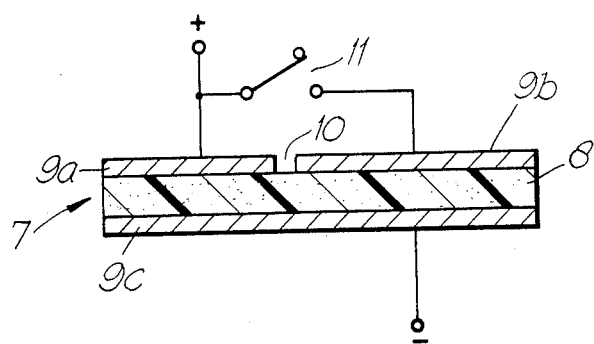
Figure 3:
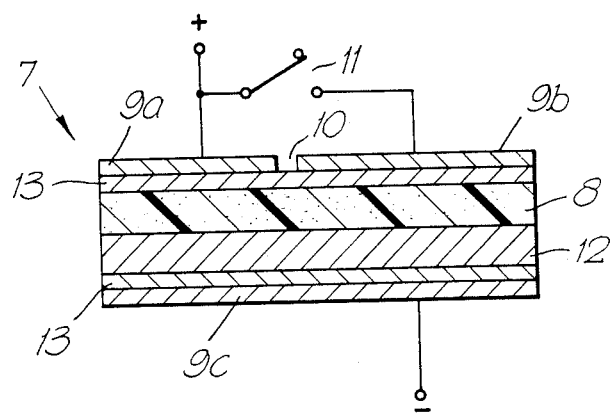
Figure 4:
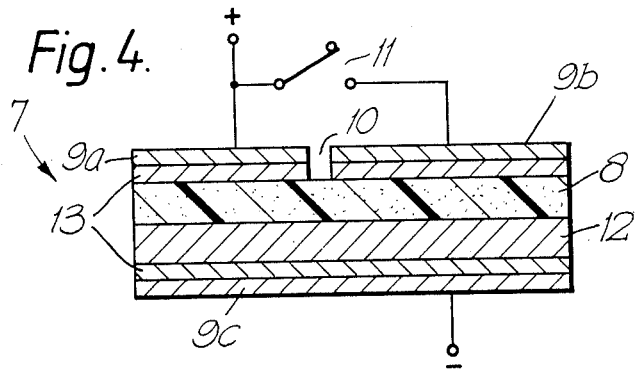

A preferred design of heater is shown in FIGS. 2, 3 and 4.

FIG. 2 shows in transverse cross-section a heater 7 in strip form comprising a resistive heating element 8, preferably self-regulating and preferably comprising a conductive polymer composition exhibiting positive temperature coefficient (PTC) behaviour, and electrodes 9a, 9b and 9c through which it is powered. The electrodes 9a and 9b are separated by a rout or other gap 10, but may be electrically connected by closing switch 11. (The word rout simply indicates a gap formed by removing a part of what was previously a single upper electrode).

A splice case or other article may be installed using such a heater 7 to activate an adhesive as follows. Initially, switch 11 is open, and as a result only part of the heater is powered, the left-hand side as illustrated. Since the size of the heater is thus reduced the current inrush will be reduced. The left-hand side of the heater will become hot, and the right-hand side may become somewhat hotter by thermal conduction, and possibly by some diagonal current flow. If a conductive polymer composition or other PTC material is used as at least part of material 8, its resistance will rise with time, and current drawn will decrease. After a given time (preferably from 0.5-5, especially about 1-3 minutes) or after a certain resistance or current is noted, switch 11 may be closed. Since more heater is thus brought into operation current will rise again, and there will be a new current peak which will again decrease with time. It may be noted that when the switch 11 is closed, the entire heater may be brought into play. It is preferred that the time of switching, and the position of electrode gap 10 (which determines the relative size of the two heater portions) are chosen such that the two current peaks are substantially equal, say one is no more than 1.5 times the other. The gap preferably divides the heater into two parts, one preferably being 30-50%, more preferably 35-45%, especially 40-45% of the total. The larger part of the heater is preferably the part that is powered first. The gap 10 preferably has a width of 0.5-2 mm and a depth (depending on electrode thickness) of from 50-200 microns. If desired the heater may comprise more than two portions, for example by providing more than one gap 10.

The switch 11 may be controlled automatically in the heater, some other part of the article of the invention, or remotely for example in a power supply. Instead of automatic operation it may be thrown manually by the installer of the article.

Preferably the heater self-regulates at a temperature between 100° and 140° C., preferably between 115 and 130° C., especially about 125° C. Its heat output is preferably 0.2 to 2.0, more preferably 0.5 to 1.4, especially 0.75 to 1.3 watts per sq. cm. The lower output will generally apply to the larger sizes of splice case or other article, and the higher output to the smaller sizes. These figures correspond to about 1100 watts per splice case power requirement.

The power source for this type of heater is preferably a 24V DC battery, but an AC source may be used for example mains power via a suitable transformer. A generator having an output of 1500 watts should be suitable.

It is desirable that the heater strip be flexible in order that it can conform to the substrates etc., that it is to heat. The heater is preferably, therefore, thin. A preferred thickness is from 400-1600, more preferably from 600-1000 microns.

The electrodes 9 preferably comprise aluminum or other conductive metal, preferably of a thickness from 10-150, especially about 25 or 100 microns depending on size and whether flexibility is required. The electrodes preferably are in the form of continuous foil, as opposed to, for example, mesh.

The heating layer 8, preferably comprises a PTC material, preferably having a resistivity before heating of preferably less than 100 ohm cm, more preferably less than 50 ohm cm, especially 5-30 ohm cm. Its thickness is preferably 50-700, more preferably 50-350 microns. It preferably contains substantially no thermally conductive, electrically poorly conductive filler (for example aluminium oxide); compare layer 12 below.

FIG. 3 shows a more complex design of heater, having additionally a ZTC layer 12. (ZTC literally means zero temperature coefficient of resistance, which is taken to means herein that over the 30° C. temperature range of greatest change in resistivity within the temperature range of operation, the resistivity alters by less than a factor of 6.) Such a ZTC layer 12 may contain a thermally conductive filler such as aluminium oxide, preferably in an amount of from 0-75%, more preferably 30-60%, which in addition to improving thermal conductivity may facilitate achievement of a desired resistivity. A resistivity of from 75-10,000 ohm cm, especially 1000 to 7000 ohm cm is preferred. Layer 12 preferably has a thickness of 50-500, especially 200-300 microns.

The heater of FIG. 3 also has two ZTC tie layers 13 between the electrodes 9a, 9b and 9c and the main heating and control layers 12,8. The function of the tie layers is to aid bonding, and they preferably comprise a polymeric material of resistivity 1–100, more preferably 5–20, especially about 10 ohm cm, and preferably have a thickness of 10–500, especially 50–200 microns.

In FIG. 3 the gap (or rout) 10 has a depth substantially equal to the electrode material. In FIG. 4, however, the gap 10 extends also through at least the tie layer 13. It may extend further, and it is possible for the portions of the heater to be entirely separate, merely being electrically connected during installation, although thermal connection is preferred.

Figure 5:
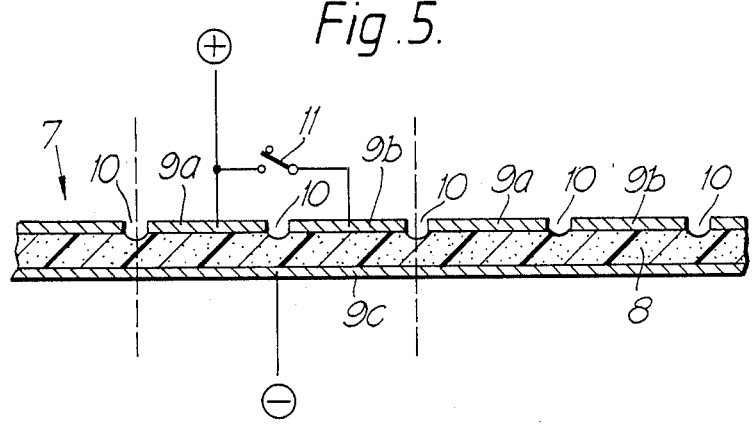

FIG. 5 shows a heater 7 having a plurality of routs or gaps 10, as may be preferred for large heaters. Examples of such large heaters include wide heaters such as those preferred as transverse heaters for the splice case to be described below. The heater therefore comprises more than one two-part heating zone, one of which is shown bordered by dotted lines. Each zone is provided with three electrodes 9a, 9b and 9c, electrode 9c preferably being common to all zones.

FIG. 6 plots the current drawn by a heater of FIG. 2–4 or by a zone of the heater of FIG. 5, as a function of time T. On powering the heater there is a large current inrush, after which the current drawn decreases due to a PTC composition 8 of the heater becoming hot (generally due in lesser part to heat generated within itself and in greater part to thermal conduction from an adjacent higher resistivity ZTC composition 12) and therefore increasing in resistivity. After a certain time $T_1$, preferably from 0.5–5, especially about 1–3 minutes, switch 11 is closed. A second current inrush is shown, consequently a second part of the heater being brought into play. It is preferred that each inrush $I_1$, $I_2$ is less than 75 amps, especially less than 50 amps, and that as mentioned above the greater of $I_1$ and $I_2$ is no more than 1.5 times the smaller. This can in general be ensured by correct positioning of gap 10 as explained above.

FIG. 7 shows how a multi-part heater may be powered. A first set of alternate electrodes 9a is initially connected to one source of power, and on closing switch 11 a second set of electrodes 9b is brought into play.

Figure 8A:
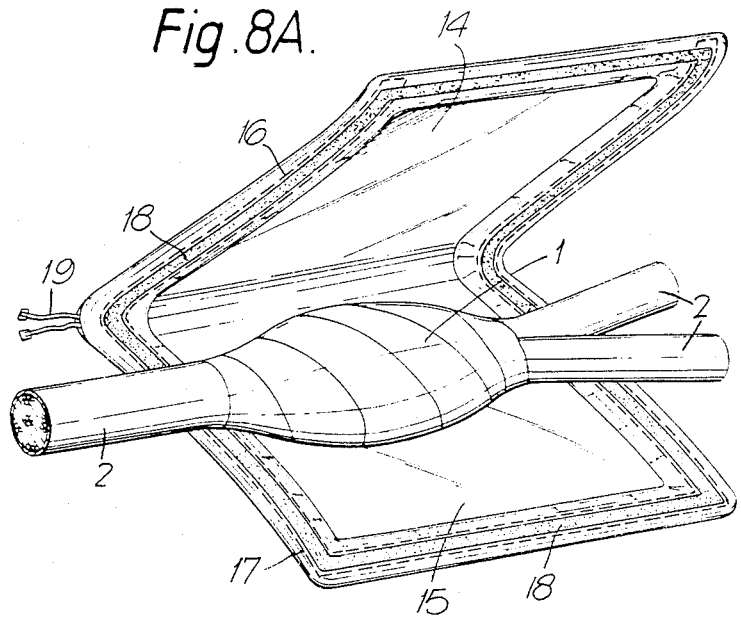
Figure 8B:
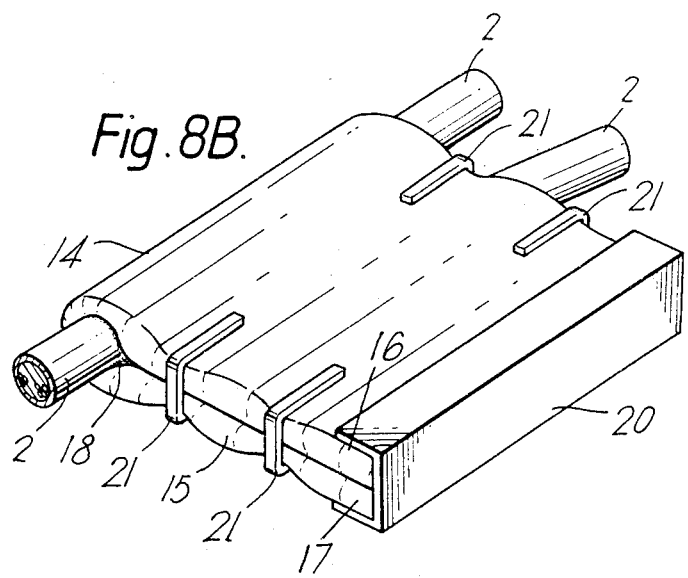
Figure 9:
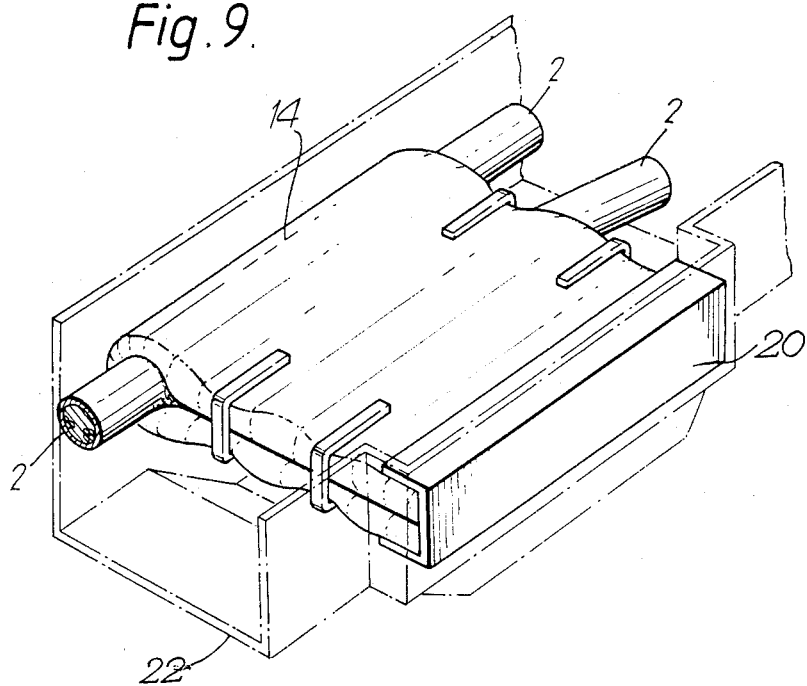

The device of the invention is preferably used with a splice case as illustrated in FIGS. 8–10. The substrate to be environmentally protected is shown comprising a cable splice 1 joining three cables 2.

The cable splice 1 is positioned between a first sheet 14 and a second flexible and substantially planar sheet 15. In this case the two sheets 14 and 15 are integral parts of a single larger sheet, which is folded in the fashion of closing a newspaper around the splice 1. Also, in this case both sheets are flexible and substantially planar.

Sheet 14 has a first edge portion 16 and sheet 15 has a second edge portion 17 between which the substrate (here a cable 2) extends. The sheets have such edge portions around three of their sides, the fourth side being a fold line of the larger sheet of which they are a part.

A heat-softenable material 18 is shown at the edge portions, such that it can form a seal between them when the sheets 14 and 15 are brought together. An electrical heating device of the invention 7 in strip form runs along the edge portions and is powered through conductors 19. The heater serves to activate the adhesive 18, thereby forming the desired seal. The heater 7 is shown dotted because it may be hidden from view, for example under adhesive 18 or within a laminate construction of sheets 14 and 15.

In FIG. 8b the two sheets 14 and 15 have been brought together with the substrate between them. The longitudinal (with respect to the substrate) edge portion of the two sheets may be held together by means of a clamp 20.

The transverse edge portions i.e. The first and second edge portions 16, 17 and those at the opposite edge portions may be held together by a clamp such as clamp 20, but we prefer narrower clamps or clips 21. Such a clip 21 may be used as a branch-off clip between the branching cables, and also at other regions as shown.

When the two sheets have been brought together heat is applied to cause the sealing material to become activated and the sealing material is displaced to form a seal between the first and second edge portions, and preferably also between the other edge portions illustrated. Thus, the sealing material is displaced to fill any voids that would otherwise result in a leak path into the splice case being formed. In particular tent shaped voids adjacent the cables may require displacement of sealing material to become sealed. One such tent-shaped void is shown in FIG. 8b filled with sealing material 18.

The sealing material may be displaced by the clamp 20 and clips 21, in which case the clamp and clips are or can be made resiliently biased to a configuration in which they force the sheets 14 and 15 together. We prefer however that the clamp and clips be substantially rigid and that some means for displacing the sealing material be provided along the edge portions, for example a foam strip.

The sheets may be formed from any suitable material, but we prefer that it comprises a laminate of one or more layers of a polymeric material, optionally with one or more layers of a metal foil, such as aluminium as a moisture-vapour barrier. One possible material is polyethylene, optionally with up to 10%, preferably up to 5% ethylene vinylacetate for improved heat sealability. Since we prefer the sheets to be highly flexible, we prefer that other layers be included for added strength since a sufficiently strong polyethylene sheet would be rather thick. Other layers may include mylar or nylon etc.

Environmental protection may be improved by the addition of a casing which may surround the sheets 14 and 15. Such a casing may serve as a rock guard etc. and/or provide thermal insulation during installation, and may be formed as two parts, one of which is shown in dotted outline in FIG. 9 as 22. A similar part may be provided above sheet 8 and joined to the part 22 by a snap fit or by catches or by a hinge etc. The clips may be fixed to the casing such that they can be slid into position over the sheets 14 and 15.

Figure 10A:
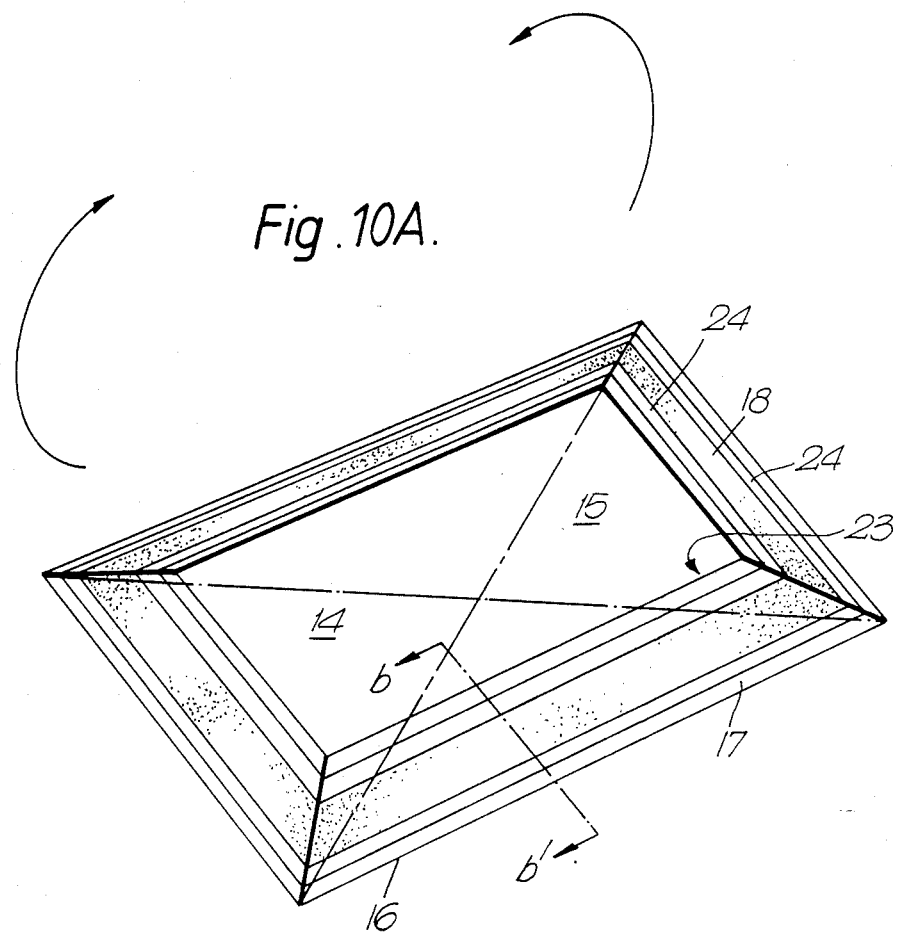
Figure 10B:
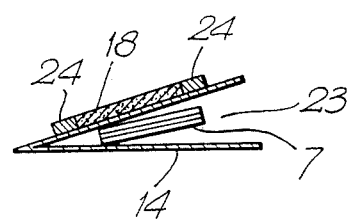

FIGS. 10a and 10b show means for aiding retention of pressure within the splice case. Here the means for aiding pressure retention is able to reduce the extent to which a seal between sheets 14 and 15 and between the sheets and the cables is put into peel by internal pressure. The means comprises a V-seal 23 along one or more edge portions of the sheets. One limb of the V-seal 23 will become bonded to the cable and to the corresponding limb of the other V-seal. The V-seal will be able to open out in response to internal pressure. The sheets 14 and 15 are of course installed by wrapping around a splice by folding as indicated by the arrows.

A cross-section through a V-seal is shown in FIG. 10b, taken along the line B-B1 of FIG. 10a. An electrical heating device 7 is shown positioned within the V-seal.

An adhesive or other sealing material 18 is shown in thermal connection with the heater, and located between means 24 for controlling the direction in which the adhesive is dispaced during installation of the article. The intention is that adhesive be displaced substantially along the edge portions, rather than into or out of the splice case. Means 24 may comprise foam or a sealing material of higher viscosity than the functional adhesive 18, for example it may comprise a mastic. The adhesive 18 and means 24 are shown along only three edges of the combined sheets 14 and 15, since only one longitudinal edge in the folded sheets needs an adhesive.

Various alternative edge portions to the sheets 14 and 15 are shown in FIGS. 11a, 11b and 11c, again showing location of the heater 7.

FIG. 11a shows an edge portion 16 provided with a means 25 for displacing sealing material 18. When the article of the invention is installed the means 25 may be or may become resiliently deformed such that on relaxing it displaces the sealing material. The heater 7 is also shown, comprising a conductive polymer composition 8 and electrodes 9 by means of which a current can be made to flow through the composition 8. The means 25 may for example comprises a foam.

In FIG. 11b the sealing material 18 is shown localized by strips of a foam or other material 24, and the heater 21 7 positioned within a V-seal 23.

In FIG. 11c the means 25 for displacing comprises a bladder that can be pressurized in order to cause displacement of the sealing material 18. The bladder may be in strip form, preferably running along the edge portions of the sheets 16 and 17, it may be more extensive.

The degree of flexibility in the heater and the effect of the means for displacing the sealing material may be seen in FIGS. 12a and 12b. Here the means for displacing comprises a foam 25. The edge portions 16,17 of the sheets are caused to conform approximately to the substrates 2 by means of clips 21. Nonetheless, tent-shaped voids 26 may remain. FIG. 12a shows the situation before an adhesive 18 has been heat-softened. After heating, the softened adhesive is displaced, as the means 25 relaxes, to fill and seal the tent-shaped voids 26 adjacent the cables. The softened adhesive may act as a lubricant allowing the radially compressive effect of the foam to act uniformly.

FIG. 13 shows a preferred design of casing 22. The casing comprises two parts 27,28 that may be hinged together along one longitudinal edge opposite edge 29, the opposite edges being secured together in some suitable manner. Plates 30 may be provided to carry out the function of the clips 21 of FIG. 8b. These plates 30 may be pre-installed in the casing on a rod or other means 31 that allows them to pivot or otherwise move into and out of slots 32. Preferably (as shown) a plate 30 may be moved in the field not only into and out of a given slot 32, but also the slot 32 into which it is to be inserted may be selected in the field. This can be achieved in the embodiment illustrated by sliding the plate 30 along rod 31 (shown for clarity positioned above its proper position), and when aligned with the selected slot 32, it is pivoted downwards. When in its final position a second rod or other means 33 is positioned to retain it. A tool may be provided to aid proper installation of the plates, if desired. It will be appreciated that the plates 30 will cause the sheets to be deformed, for example as illustrated in FIGS. 12a and 12b, thus bending the heater 7.

FIG. 14 shows a way in which heaters 7 may be arranged on sheets 14 and 15. As before, the heaters may comprise a conductive polymer 8 and electrode 9, two electrodes on one side of the polymer being separated by a gap 10. It will be seen that there is one longitudinal edge heater, and two transverse or side edge heaters. They may be electrically connected together by any suitable means. Preferably, the transverse heaters are wider than the longitudinal heaters since a wider layer of adhesive may be provided there due to the greater difficulty of forming a seal around the cables. Also, the longitudinal heater need not be flexible and may therefore be thicker. In particular it may have thicker electrodes, (for example about 100 microns compared with 45 microns for the transverse heaters) and act as a bus for the transverse heaters. The transverse heaters preferably have a width of 4–12, especially 5–10 cm depending on the size of the final article. The longitudinal heater preferably has a width of from 1–5, especially 2–3 cms. These widths in general correspond to lengths of 20–100 especially 25–75 cms for the transverse heater, and 50–150, especially 60–130 cms for the longitudinal heater.

The generally wider transverse heaters preferably have gaps 10 at a position 35–45% of their width. The generally narrower longitudinal heaters may more conveniently have a gap (if at all) at about 50%.

It has been found beneficial that the transverse heaters, when employed in a small size splice case (heater size say about 30 cms by 6 cms) include a ZTC heating layer (see layer 12 of FIGS. 3 and 4) having a resistivity of from 1500–2000 ohm cm. a transverse heater for a large size of splice case, and longitudinal heaters for both layer and small splice cases, preferably employs a ZTC layer 12 of resistivity 4500–6000, especially about 5500 ohm cm.

FIGS. 15a and 15b show a novel safety device that may be provided. FIG. 15a shows a sheet 14 with a V-seal 23 at its edge. A heater 7 comprising a PTC heating composition 8 and electrodes 9 is provided within (or otherwise adjacent) the V-seal. The sheet 14 comprises a laminate of various layers comprising for example a polymeric insulating material 34,35 surrounding conductive sheets 36 as shown in FIG. 15. The polymeric insulating material 34 should have a melting point chosen as a maximum temperature that is regarded as safe in the product. Thus, if that temperature is exceeded a fault in the heater is assumed to have occurred, for example due to shorting or application of excessive power. a preferred material for the insulating layer melts at a temperature from 150°–275° C., especially 175°–250° C. The material may comprise a polyester such as Mylar (trade mark) or nylon. Above the chosen temperature, the material 34 melts and one or both of the electrodes comes into electrical contact with a layer 36. The electrodes 9 may be powered such that they are at, say, 0 volts ($V_1$), and 24 volts ($V_2$), and the layers 36 maintained at, say 12 volts ($V_3$). The article of the invention may thus be connected to a power supply by means of a three conductor cable via a plug (represented by double arrow-heads one of which is labelled 37), one of the wires (or other conductor) 38 being connected to layers 36. Those layers are preferably otherwise substantially entirely electrically insulated from the environment. When a fault occurs the layer 36 becomes polarized to 0 or 24 volts, i.e. different from V$_3$, and thus is detected by detection means 39, which then sends a signal to connection means 40 which can short out the power within the power supply causing fuse 41 to blow, or other current cut-off to operate. Thus, the fuse is preferably of a size that it will cause an open circuit if subjected to a voltage substantially equal to the normal operating voltage of the heater. Detection means 39 may comprise an operational amplifier, which responds to an imbalance caused by the fault, and then sends a current pulse to means 40. Means 40 may comprise a thyristor gate which becomes conductive on receivng that current pulse. FIG. 5 is merely schematic and other electrical circuitry may be used.

The safety device may be modified such that the fuse 41 is within the sheet 14 or 15, rather than within the power supply. Thus, if there is a fault the sheet may be rendered impossible to power again, thus preventing further danger if re-use is attempted. This can be done by providing an extra wire to the power supply.

In FIG. 16 a power supply 42 houses a power source, illustrated as a battery, a green light 43 indicating when power is switched on, and a red light 44 indicating a fault. When the power is first switched on, the electrodes 9b and 9c are powered, causing the right-hand side of the heater 7 to heat up. After, say, one minute switch 11 may be manually or automatically closed causing electrode 9a also to be powered.

If a faualt occurs, an electrode 9a,9b,9c will contact conductive layer 36 causing an imbalance in operational amplifier 45, which then sends a positive current pulse to thyristor gate 46. This causes fuse 41 to blow, thus cutting-off power from the article comprising the heater. It can be seen that the fuse is provided in the article itself. When the fuse 41 is blown, the red light 44 will become powered.

FIG. 17 shows in perspective a heater 50 in coaxial strip form comprising a resistive heating element 51, preferably self regulating and preferably comprising a conductive polymer composition exhibiting positive temperature coefficient (PTC) behaviour, and electrodes 52a, b and c through which it is powered. Electrodes 52a and b are spirally wound strips, wound so that there is a gap between adjacent turns of the strip. The electrodes 52a and b can be electrically connected by closing switch 53.

Powering of heat 50 is the same as powering of heater 7 described with reference to FIG. 2. Initially switch 53 is open and only part of the heater is powered. Then the switch is closed and the whole heater is powered. The effect is that in-ruch current is reduced. This is particularly advantageous where long length coaxial strip heaters are used.

For the avoidance of doubt it is here stated that the invention provides an electrical device and various uses thereof. The invention may employ any one or more of the features disclosed herein. For example any one or more of the heater designs, sheet designs, clips, clamps, casing designs, means for displacement, sealing materials or applications of use may be selected.

We claim:

1. An electrical heater in strip form, which comprises:
   (a) a conductive strip heating element comprising a conductive polymer composition;
   (b) a first electrode in strip form lying on a first surface of said strip and running along said strip;
   (c) a second electrode in strip form lying on said first surface of said strip and running along said strip, said second electrode being spaced apart from said first electrode;
   (d) a third electrode lying on a second surface of said strip opposite said first surface and running along said strip;
   (e) means by which the first and second electrodes can be connected together;
   (f) means by which the first and/or second electrodes can be connected to a first polarity of a source of electrical power; and
   (g) means by which said third electrode can be connected to a second polarity of said source of electrical power;
   the electrical widths of the first electrode being from 30–50% of the electrical width of the third electrode.

2. An electrical heater in strip form, which comprises
   (a) a conductive strip heating element comprising a conductive polymer composition;
   (b) a first electrode in strip form lying on a first surface of said strip and running along said strip;
   (c) a second electrode in strip form lying on said first surface of said strip and running along said strip, said second electrode being spaced apart from said first electrode;
   (d) a third electrode lying on a second surface of said strip opposite said first surface and running along said strip, said third electrode being substantially coextensive with both of said first and second electrodes and space therebetween;
   (e) means by which the first and second electrodes can be connected together;
   (f) means by which said first and/or second electrode may be connected to a first polarity of a source of electrical power; and
   (g) means by which said third electrode can be connected to a second polarity of said source of electrical power.

3. An electrical heater which comprises
   (a) a first part comprising
      (i) a first electrode
      (ii) a second electrode
      (iii) a heating element comprising a first conductive polymer composition exhibiting PTC behaviour, and being electrically connected to the first and second electrodes such that when a source of electrical power is connected to the first and second electrodes current I$_1$ flows through the composition causing it to become hotter and its resistivity thus to increase, the maximum current flowing I$_{1MAX}$ being less than 75 amps;
   (b) a second part, in thermal contact with the first part and comprising;
      (i) a third electrode
      (ii) a fourth electrode
      (iii) a heating element comprising a second conductive polymer composition exhibiting PTC behaviour and being electrically connected to the third and fourth electrodes such that when a source of electrical power is connected to the third and fourth electrodes current flows through the composition causing it to become hotter and its resistivity thus to increase; and
   (c) means whereby said first and second parts can be connected in parallel;
   the first and second heating elements being such that if the first and second parts are connected in parallel after t seconds a current I$_2$ flows through the combined first and second parts the maximum of which I$_{2MAX}$ is less than 75 amps, there being a value of t at which the ratio between $I_{1MAX}$ and $I_{2MAX}$ is from 1.5:1 to 1:0.67.

4. An electrical heater in sheet form, which comprises:
   (a) a conductive sheet heating element comprising a conductive polymer composition;
   (b) a first electrode in strip form lying on a first surface of said sheet;
   (c) a second electrode in strip form lying on said first surface of said sheet and being spaced apart from and substantially parallel to said first electrode;
   (d) a third electrode in strip form lying on said first surface of said sheet and being spaced apart from and substantially parallel to said second electrode;
   (e) a fourth electrode lying on a second surface of said sheet, opposite said first surface, said fourth electrode being substantially coextensive with said first, second and third electrodes and spaces therebetween;

said first, second and third electrode being alterable between the following states
   (i) in which each of said first, second and third electrodes is substantially electrically insulated from another, other than through the sheet
   (ii) in which two of said first, second and third electrodes are connected together and those two are substantially electrically insulated from the third other than through the sheet; and
   (iii) in which the said first, second and third electrodes are connected together.

5. An electrical heater which comprises a laminate of the following layers in the following order
   (a) first and second substantially coplanar electrodes in strip form;
   (b) a conductive polymer composition exhibiting PTC behaviour;
   (c) a ZTC composition comprising a conductive polymer and a thermally conductive filler therein; and
   (d) a third electrode.

6. An electrical heater which comprises a laminate of the following layers, in the following order
   (a) a first electrode;
   (b) a ZTC composition having a thickness of from 10-500 microns and a resistivity at 20° C. of from 1-100 ohm cm;
   (c) A PTC composition having a thickness of from 50-350 microns and a resistivity below its switching temperature of from 1-100 ohm cm;
   (d) A ZTC composition having a thickness of from 100-500 microns and a resistivity at 20° C. of from 75-10,000 ohm cm;
   (e) a ZTC composition having a thickness of from 10-500 microns and a resistivity at 20° C. of from 1-100 ohm cm; and
   (f) a third electrode.

7. An electrical heating apparatus which comprises:
   (a) an electrical heater comprising
      (i) a first part comprising a first and a second electrode and a first conductive polymer composition exhibiting PTC behaviour, the composition being electrically connected to the first and second electrodes such that when a source of electrical power is connected to the first and second electrodes current flows through the composition causing it to become hotter and its resistivity thus to increase, and
      (ii) a second part comprising a third and a fourth electrode and a second conductive polymer composition exhibiting PTC behaviour, the composition being electrically connected to the third and fourth electrodes such that when a source of electrical power is connected to the third and fourth electrodes current flows through the composition causing it to become hotter, and its resistivity thus to increase;
   (b) means for providing a thermal connection between said first and second parts such that current flow through the first composition causes an increase in resistivity of the second composition;
   (c) means for connecting the first part and the second part together in parallel with respect to a common source of electrical power.

* * * * *